US008403722B2

(12) United States Patent  
Madonia

(10) Patent No.: US 8,403,722 B2  
(45) Date of Patent: Mar. 26, 2013

(54) RAISED TRAY WITH MOULDED CANAL

(76) Inventor: John Madonia, Brampton (CA)

( * ) Notice: Subject to any disclaimer, the term of this patent is extended or adjusted under 35 U.S.C. 154(b) by 323 days.

(21) Appl. No.: 12/780,765

(22) Filed: May 14, 2010

(65) Prior Publication Data

US 2010/0221390 A1 Sep. 2, 2010

Related U.S. Application Data

(63) Continuation-in-part of application No. 11/031,652, filed on Jan. 5, 2005, now abandoned.

(51) Int. Cl.
*A63H 33/00* (2006.01)

(52) U.S. Cl. .......................................... 446/85; 446/104

(58) Field of Classification Search .................... 446/85, 446/86, 108, 110, 115, 122, 127; 426/104, 426/132

See application file for complete search history.

(56) References Cited

U.S. PATENT DOCUMENTS

| 2,441,761 | A | * | 5/1948 | Guelicher | 446/110 |
| 2,775,523 | A | * | 12/1956 | Green | 426/104 |
| 4,306,371 | A | * | 12/1981 | Walmer et al. | 446/110 |
| 4,431,395 | A | * | 2/1984 | Babos | 425/298 |
| D314,854 | S | * | 2/1991 | Brown | D1/106 |
| 6,176,465 | B1 | * | 1/2001 | Cooper et al. | 249/155 |
| 7,210,920 | B2 | * | 5/2007 | Kolz | 425/298 |
| 7,241,198 | B1 | * | 7/2007 | Boone | 446/476 |
| 2002/0155196 | A1 | * | 10/2002 | Kiely | 426/89 |
| 2004/0142063 | A1 | * | 7/2004 | Kolz | 425/298 |
| 2006/0032383 | A1 | * | 2/2006 | Madonia | 99/485 |
| 2009/0181134 | A1 | * | 7/2009 | Lefevre | 426/113 |

* cited by examiner

*Primary Examiner* — Nini Legesse  
(74) *Attorney, Agent, or Firm* — The Miller Law Offices PLC; Steven J. Miller, Esq.

(57) ABSTRACT

The present invention is a horizontal base for stabilizing vertically extending walls comprising a tray surface elevated from said base, the tray surface defining at least one moulded canal of a pre-defined shape, the at least one moulded canal being defined to receive at least one of said vertically extending walls. The base is preferably used in arts and crafts endeavours and in particular, for improved efficiency in the construction of gingerbread-based structures such as gingerbread houses.

26 Claims, 9 Drawing Sheets

RAISED TRAY WITH MOULDED CANAL

CROSS REFERENCE TO RELATED APPLICATIONS

This application is a Continuation-In-Part of, and claims priority from, U.S. application Ser. No. 11/031,652 filed on Jan. 5, 2005.

FIELD OF THE INVENTION

The present invention relates to raised trays having moulded canals, and more specifically to said trays used in the manufacture of arts and crafts, especially gingerbread houses.

BACKGROUND OF THE INVENTION

Construction of various arts and crafts objects often require assembling and adhesion of two or more vertical walls together. This type of construction is frequently seen in the assembling of gingerbread houses—a confectionery-based craft immensely popular with children worldwide, particularly during holiday seasons like Christmas. Gingerbread house construction has been apparently known in Germany since the eleventh century, and very little, if anything, has changed in the method of gingerbread house construction.

A large variety of gingerbread house models are known, such as Chuang (U.S. Pat. D465,314S and D453,123S), Brown (U.S. Pat. D314,854S) and Chiu (U.S. Pat. D378,286S). However, one-person assembly of such gingerbread houses (and other gingerbread-based structures) is typically difficult and cumbersome, especially at the starting stage. Although children are typically the largest target audience of the gingerbread-based industry, most children require adult assistance in the actual assembly of gingerbread-based structures having more than one vertical wall. Even adults typically require a second set of hands to properly build a gingerbread house in a time-efficient manner.

The standard mode of construction of gingerbread-based structures (having more than one vertical wall) typically first requires that the consumer acquire a flat surface upon which to work. The flat surface may be a counter top, but is more typically a flat cardboard slate having a food-grade foil-wrap. Other types of flat surfaces (made of various materials) can be used, and may be provided within a pre-fabricated gingerbread house kit to the consumer. The flat surface, apart from preferably being safe for food handling, usually presents no other significant advantages. These surfaces have historically always been flat (ie planar), and offered no building advantage to the consumer.

The consumer places two pieces of gingerbread onto the flat surface, and bonds them together typically using an adhesive (edible) confectionery icing already known in the industry. Eventually, in the standard gingerbread house construction, the consumer attempts to add a third and fourth vertical wall, and attempts to bond them to the previously bonded walls (again using the edible adhesive icing). The icing takes time to dry, and if a consumer lets the walls go too quickly, their construction falls apart. It is impractical for one person or two people to stand in one spot, and hold their walls together, until the icing dries. The vertical walls must also, almost simultaneously, be bonded to the flat working surface (for portability, stability, cosmetics and display in different locations). This is difficult, time-consuming, frustrating, and destroys what should otherwise be an enjoyable food-making experience.

This preliminary assembly step (of gingerbread houses) is problematic for at least two reasons: first, the flat surface does not provide any guidelines as to the orientation of one vertical wall to another or in relation to the flat surface, and so the consumer is left to guess whether the angles formed by one wall bonding to another are sufficient in order to produce a stable gingerbread house (ie is the consumer actually adhering the walls at right angles, which is an ideal assembly?), or the position of a wall in relation to the surface is sufficient in terms of allocated space; and second, when the consumer attempts to bond and stabilize all four walls together, the walls typically shift in position (due to uneven pressure applied by the consumer's hands), and this results in a warped-shaped or otherwise unstable and cosmetically unappealing gingerbread house. The latter is particularly disappointing for children.

These difficulties cannot normally be overcome unless the consumer recruits a second individual to assist in holding and stabilizing some of the vertical walls, and additionally requires the consumer to pre-plan the placement of all walls of the proposed structure. These difficulties are also present in other gingerbread-based structures, for example, gingerbread-based railroad cars/trains. One-man construction of gingerbread houses is typically time-consuming and generally not an enjoyable experience to all but the most patient. One-man construction is not practical.

SUMMARY OF THE INVENTION

In a preferred embodiment the present invention provides a gingerbread construction platform comprising a tray having an elevated top surface, and defining support walls of pre-determined height to support and elevate the top surface from the tray. There is at least one canal defined within the top surface, to receive icing and an edible wall of pre-defined width therein, with each canal being a pre-defined width and depth.

DETAILED DESCRIPTION OF THE DRAWINGS

Figure 1:
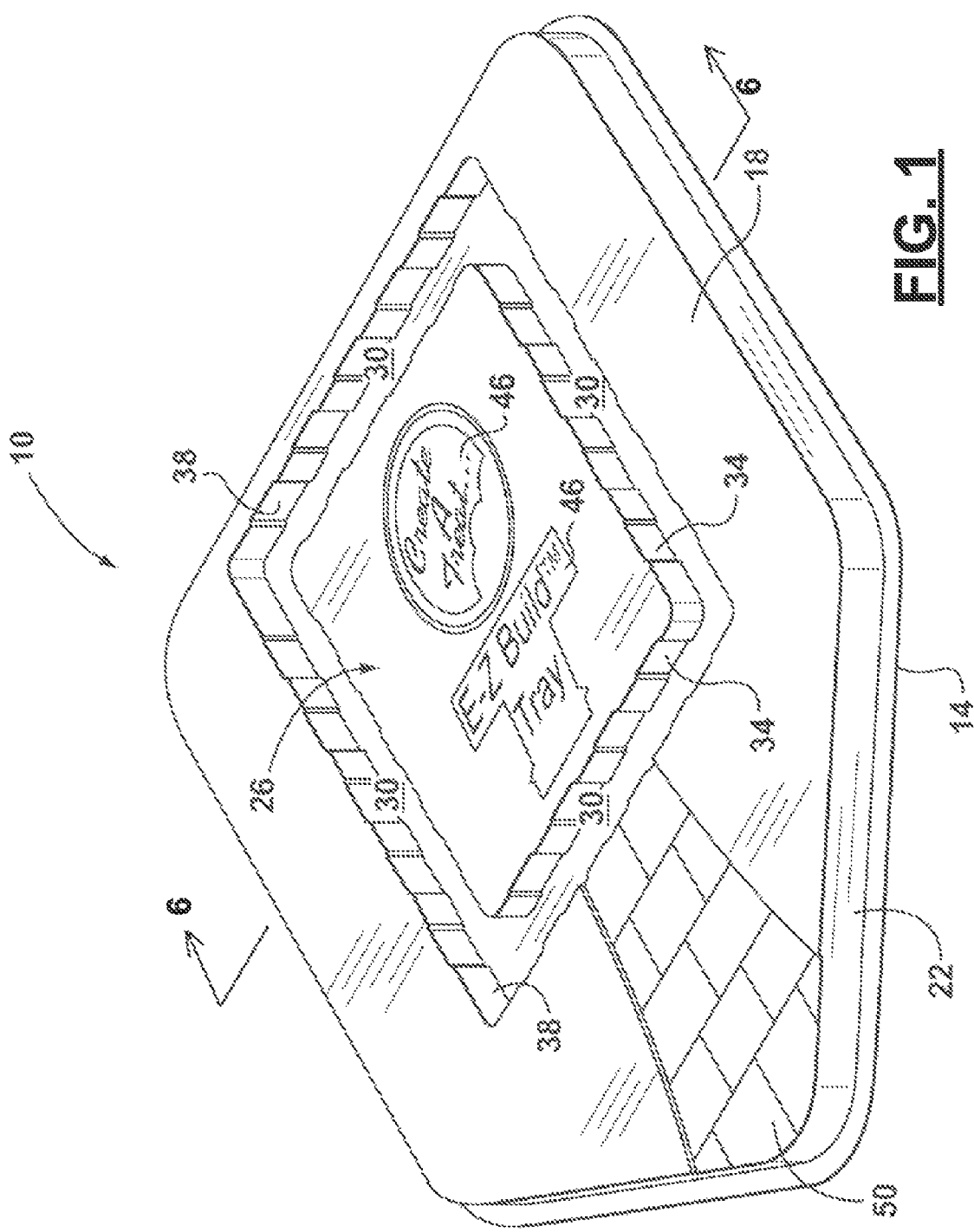
FIG. 1 is a topside perspective view of a raised tray with a moulded canal.

FIG. 1 refers to one preferred embodiment of the present invention, showing a gingerbread construction platform (10) in a form of a tray (14) having an elevated (or raised) top surface (18) defining support walls (22) extending vertically from the tray (14). That is, the tray (14) is a base from which the support walls (22) vertically extend to a pre-determined height. The walls (22) act to support and elevate the top surface (18) from the tray (14).

Figure 2:
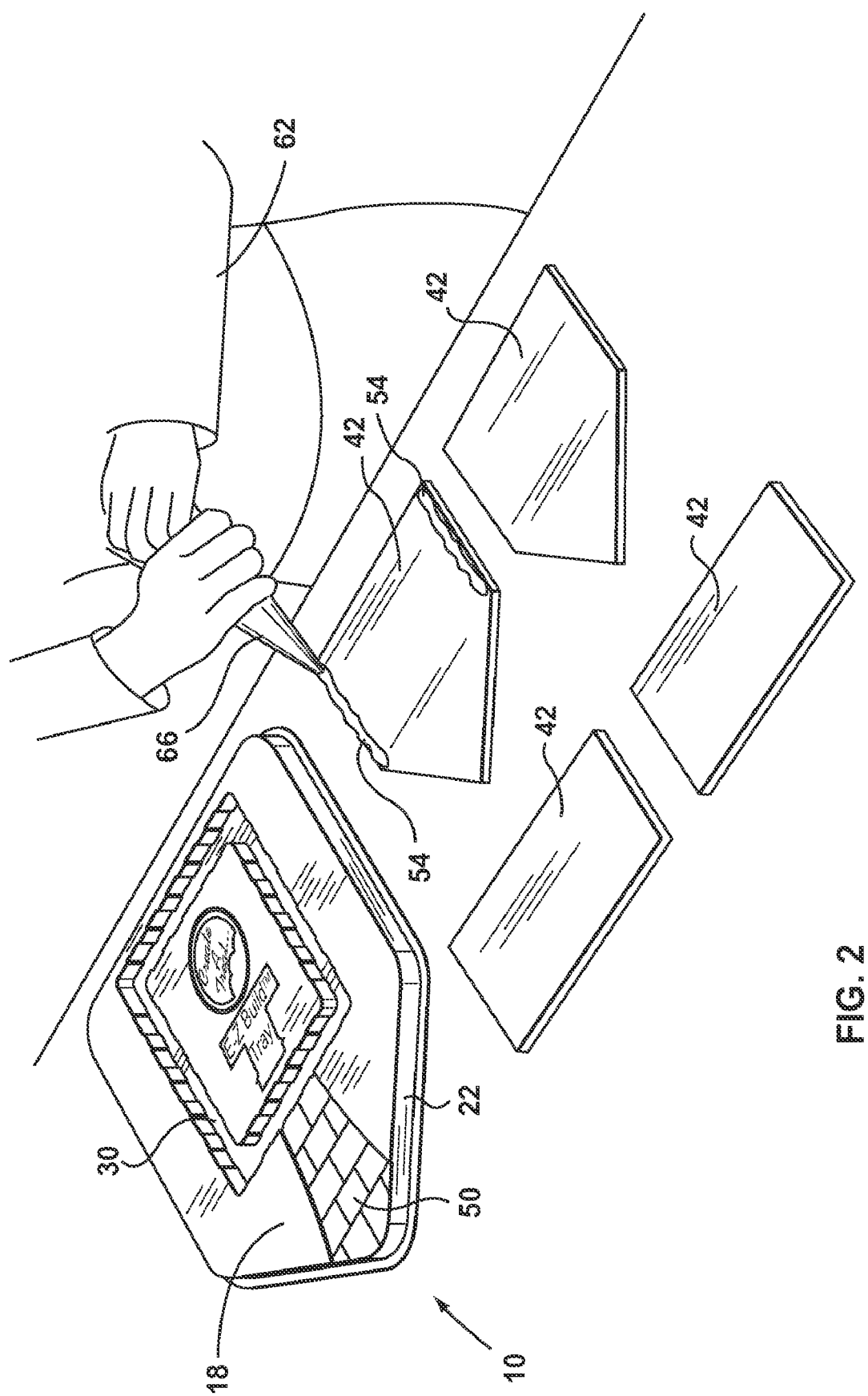
FIG. 2 is a perspective view of a raised tray and vertically extending walls being prepared for assembly to the tray.
Figure 3:
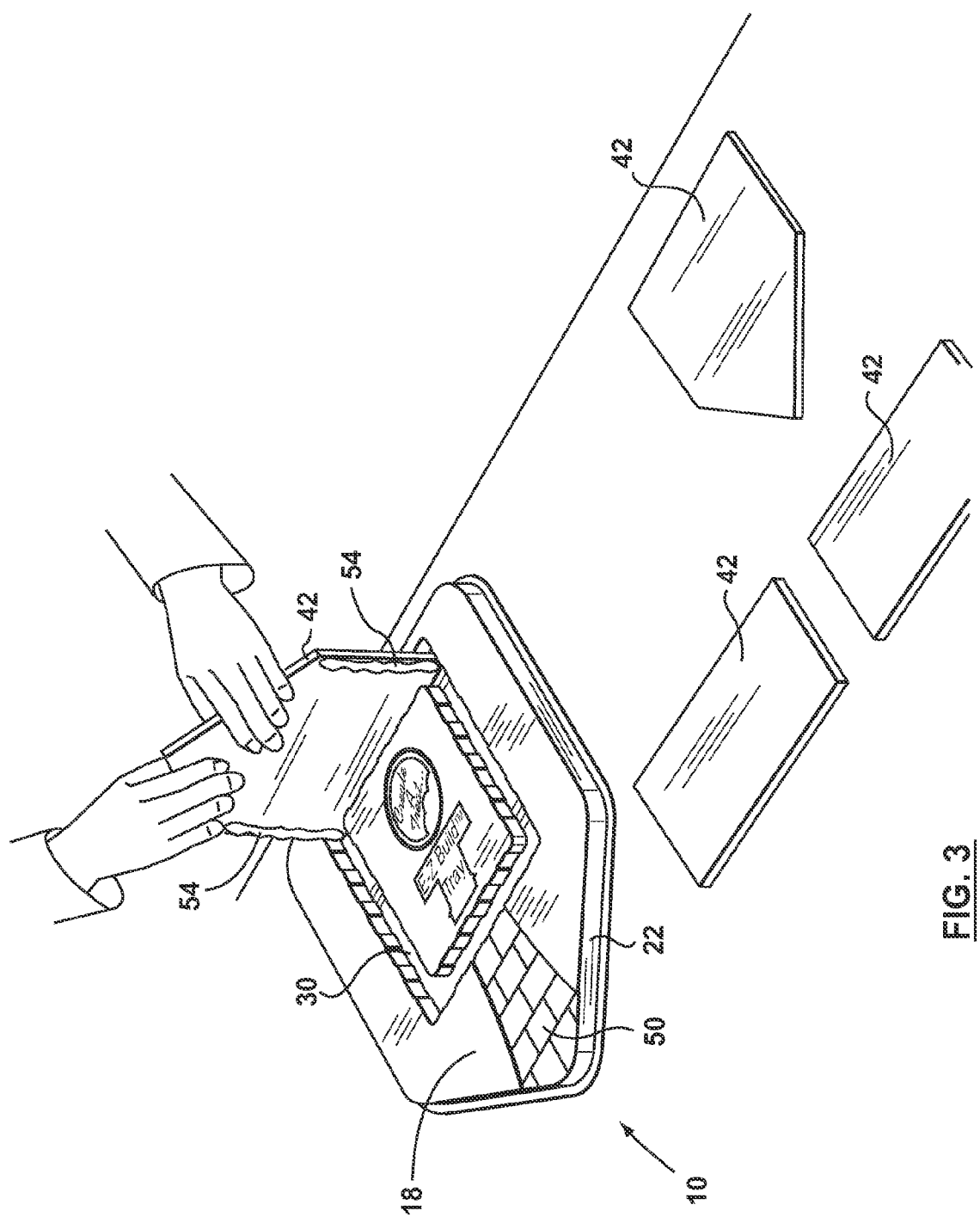
FIG. 3 is a perspective view of a raised tray and one vertically extending wall being assembled to the tray.
Figure 4:
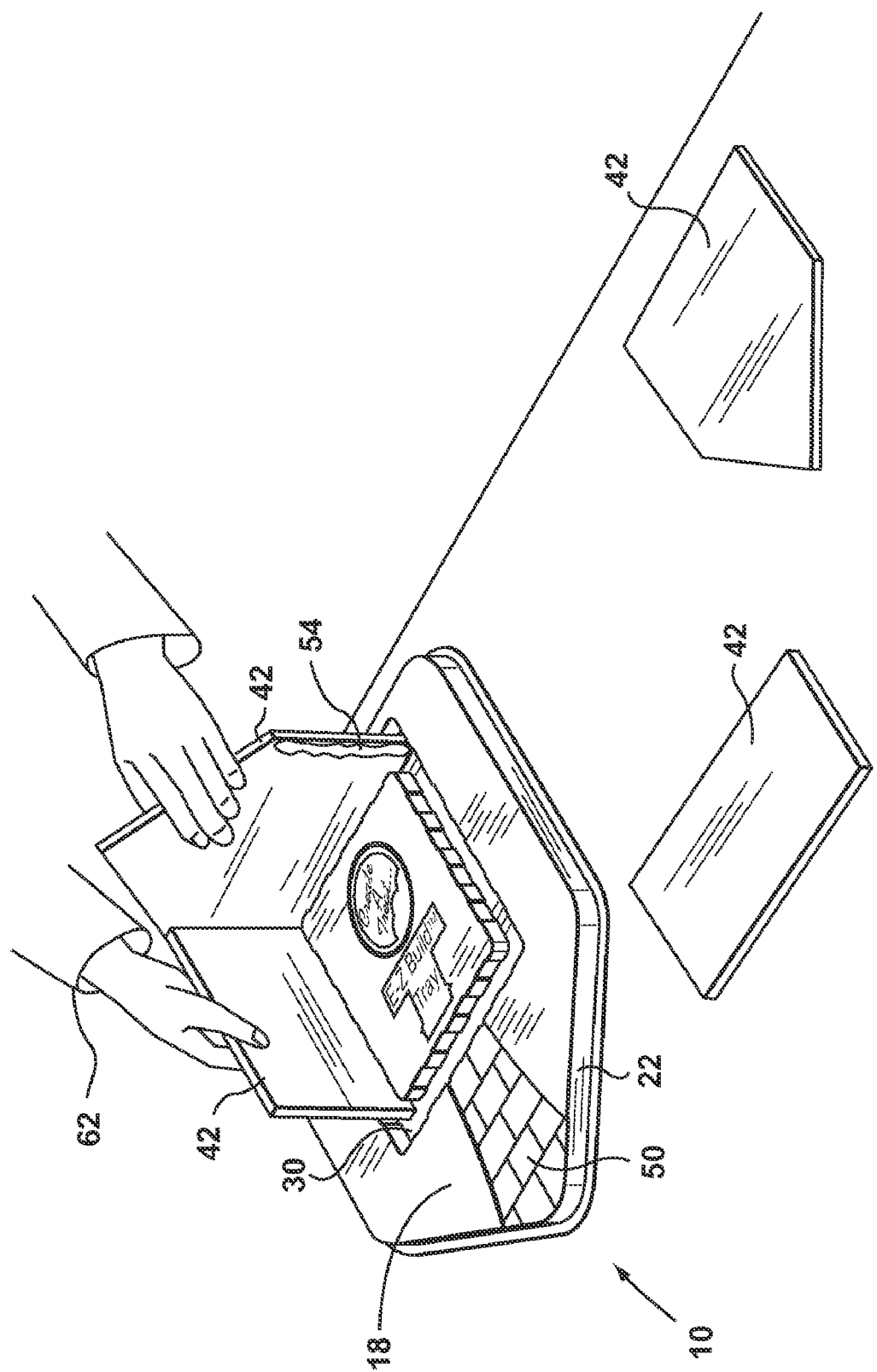
FIG. 4 is a perspective view of a raised tray and two vertically extending walls being assembled to each other and the tray.
Figure 5:
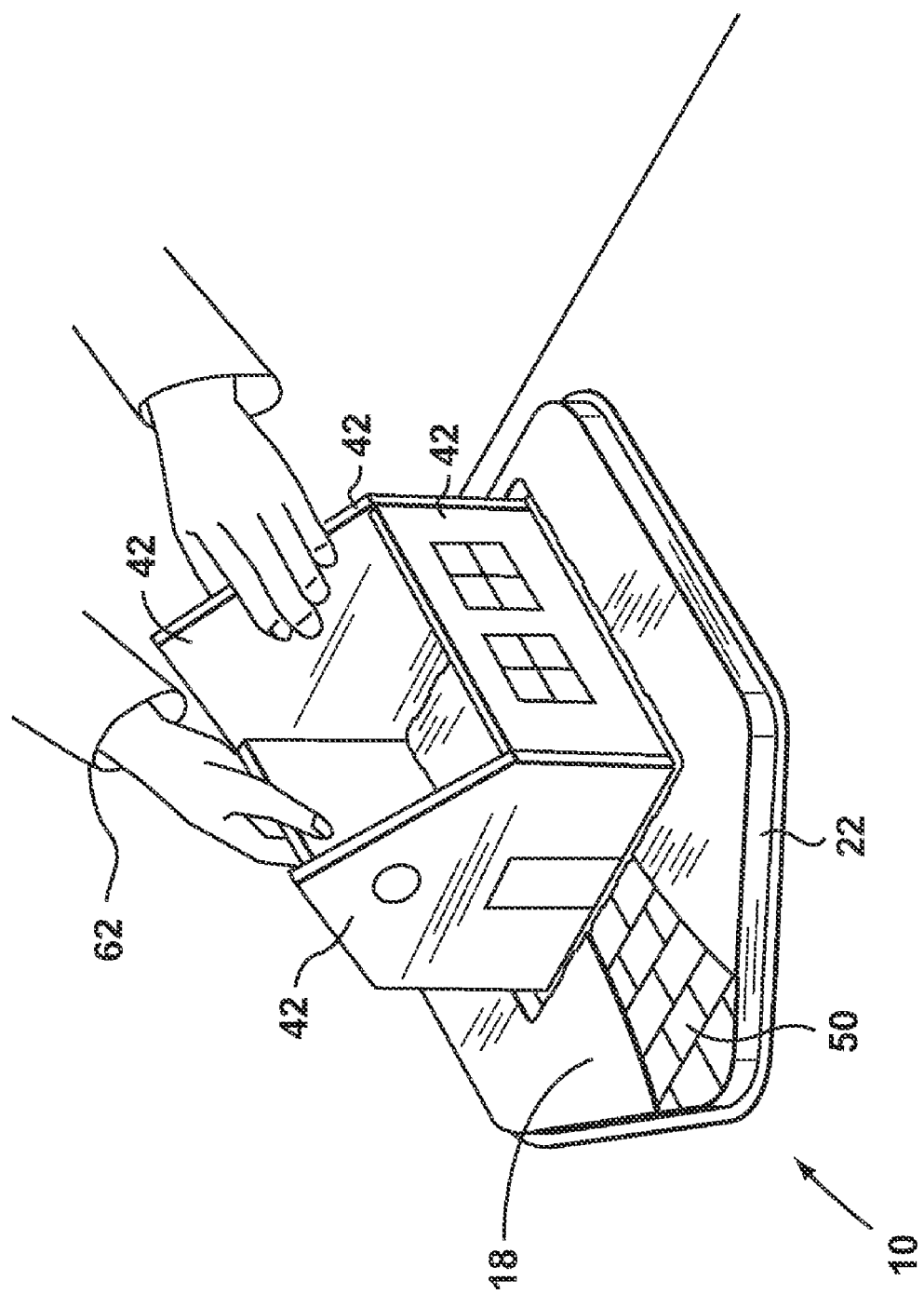
FIG. 5 is a perspective view of a gingerbread house construction near completion in the tray.
Figure 6:
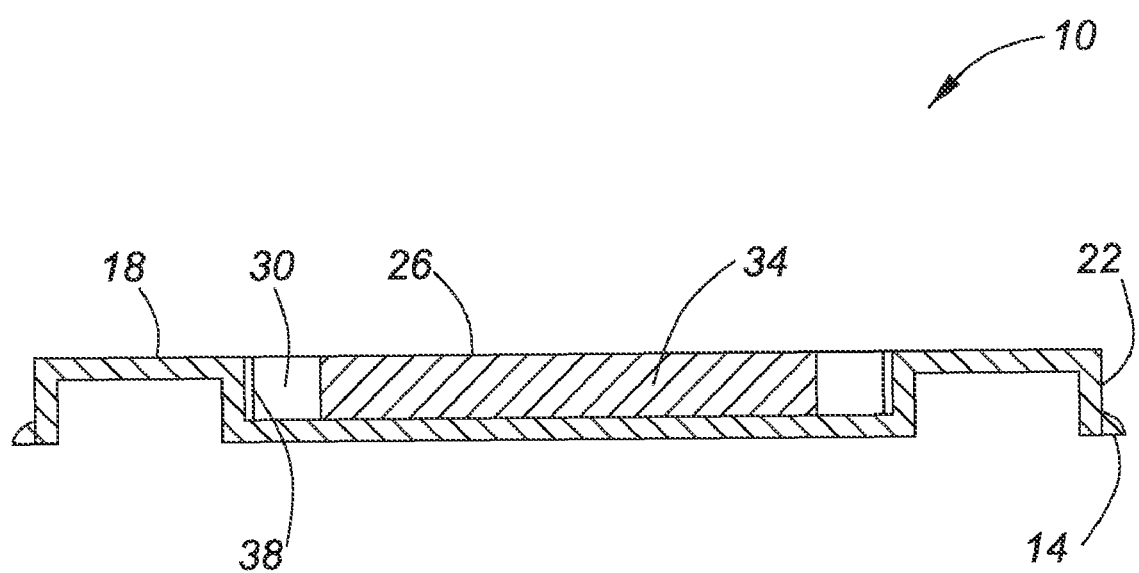
FIG. 6 is a cross-section along the line 6-6 in FIG. 1.

A central portion (26) of the tray (14) defines a moulded canal (30). The canal (30) is inscribed by an inner (34) and outer (38) canal perimeter wall, and is defined to receive at least one vertically extending edible wall (42) of a pre-defined width (see FIG. 2). The canal (30) may optionally define a single separate arbitrary start and stop point (as shown in (72) in FIG. 7), or may be continuous by enclosing in on itself to form one continuous channel (FIG. 1). In an instance where the canal (30) is continuous and encloses onto itself, the canal (30) typically forms a quadrilateral or a square shape, ideal for forming a gingerbread house (FIGS. 4 & 5).

When the top surface (18) defines a plurality of canals (30), each canal (30) may be orientated within close proximity to another, to facilitate erection of any structure having spaced vertical walls (42). In another optional configuration, the canals (30) may define pinched ends (not shown) to clearly indicate a start and stop point of the canal (30), with the pinched ends defining small openings or gaps (not shown) to openly communicate with other adjacent canals (30). Yet another optional configuration is to define some canals (30) as being in close proximity with other canals (30), but not in open communication with those other canals (30), while other canals (30) are defined to be in open communication with still other canals (30) (for example, see FIG. 7). The placement, shape, number and positioning of the canal(s) (30) can be readily varied as required by any particular project, and in endless combination and variation.

The canals (30) may be of differing width (although most projects will typically require an identical width), and are of a pre-defined shape and size so as to matingly receive a vertical wall (42). The canal (30) width may be equal to the edible wall (42) width, or may be slightly less (ie narrower) or even greater (ie wider) than the edible wall (42) width. Where the canal (30) is narrower, it still may be possible (though difficult) to fit the edible wall (42) therein given the platform (10) is typically made from a flexible and pliable plastic, allowing the canal (30) width to expand slightly. If the canal (30) is narrower than the edible wall (42) width, the fitting of the wall (42) into the canal (30) will be relatively very tight. In most cases, it will make more sense to have the canal (30) width about equal to, or even very slightly greater than the edible wall width (42). An adhesive (54) (such as edible icing (which hardens over time) in the case of a gingerbread house) can be optionally applied to the canal (30) to increase the stability of the vertical wall (42) mated to the canal (30).

The edible walls (42) are classically made of gingerbread (for which recipes can vary). The walls (42) need not be house-shaped walls, or even quadrilateral. The edible walls (42) are understood to be any edible construction capable of standing upright, especially once placed into the canal (30). For example, the edible wall (42) can be shaped as an evergreen tree, or even just a portion of an evergreen tree (not shown) (as in a case where a gingerbread evergreen tree is to be constructed using multiple separate pieces to give a three-dimensional perspective). The edible walls (42) can even be wheel/round shaped, in a case of making wheels (not shown) for attachment to a gingerbread train (not shown), and the like, and pointed, in a case for making an upright gingerbread heart (such as for St. Valentine's Day). The edible walls (42) need not have straight or flat edges—they do need to be able to stand upright once in the canal (30) (with or without addition of adhesive (54)).

The canal inner (34) and outer (38) perimeter wall heights are less than the support wall (22) height. If the platform (10) were to be overturned (FIG. 8), it could be seen that the canal (30) depth would be less than the support wall (22) height. One reason it is preferred to have the inner (34) and outer (38) perimeter wall heights less than the support wall (22) height is that if the canal (30) is too deep, it will waste more of the edible wall (42). When the edible wall (42) is affixed into the canal (30) using adhesive (54) icing, and that icing hardens, typically that portion of the wall (42) sitting in the canal (30) cannot be broken free and removed from the canal (30) (meaning that some portion of the wall (42), integrated with now hardened icing adhesive (54), may remain within the canal (30)). Once a gingerbread structure is broken apart for eating, and an attempt is made to remove it from its construction platform (10), it is likely that the canals (30) will retain portions of the broken edible walls (42) therein, and those broken portions will not be removable, and so wasted. The deeper the canal (30) gets, the more of the edible wall (42) can be wasted. For that reason, it makes sense to have a canal (30) shallower than the supporting wall (22) height.

The platform (10), or portions thereof, can be made from a variety of materials. In the instance of a gingerbread house kit, it is preferable to make the platform (10) from a food grade material, and in particular, a food-grade plastic. Polyethylene terephthalate (popularly known as PET plastic within the industry) is an excellent choice in particular for construction of the platform (10) and can be manufactured using any standard industrial method such as vacuum forming, injection moulding, or others.

The platform (10) can be used to indicate a manufacturer's trade-mark (46), or other cosmetic variations as the project requires. In the instance of a gingerbread house, the platform (10) can be texturized to simulate an interlocking brick walkway (50) to the gingerbread house. In the instance of a gingerbread train or railway cars (not shown), the texturized surface can simulate train tracks (not shown) or adjuncts of a train station (not shown). Still other portions of the platform (10) can define smaller individual canals (30) to receive smaller edible walls (42) for additional cosmetics (such as a snowman (not shown) in the instance of a gingerbread house winter scene).

Figure 7:
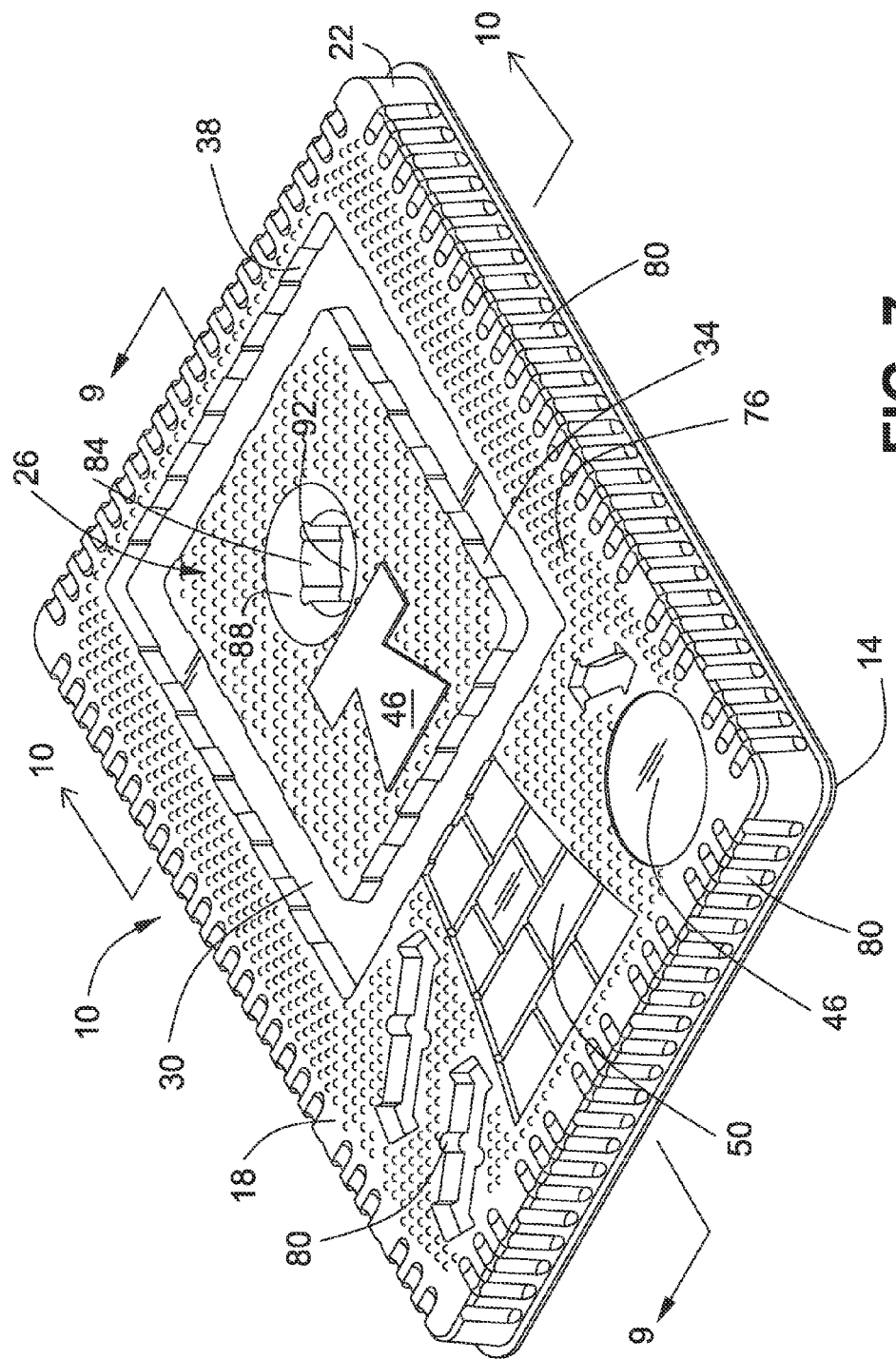
FIG. 7 is a topside perspective view of another embodiment of a raised tray with a moulded canal.

FIG. 7 refers to another preferred embodiment of the present invention, showing a gingerbread construction platform (72) in a form of a tray (14) having an elevated top surface (18) defining support walls (22) extending vertically from the tray (14).

One difference in the embodiment in FIG. 7, as compared to the one in FIG. 1, is that the FIG. 7 embodiment shows a structural improvement in a form of a plurality of dimples (76) marking the top surface (18). The dimples (76) are spread across the top surface (18), including the tray central area (26). These dimples (76) may project upwardly (from the top surface (18)), or downwardly (from the top surface (18)) according to construction preference. These dimples (76) improve the platform's (72) rigidity, making it less susceptible to buckling or collapse, as compared to the embodiment in FIG. 1, and do not interfere with gingerbread constructions made on the platform (72). This allows the user (not shown) to place heavier constructions upon the platform (72), with more confidence the platform (72) will withstand the extra weight without buckling.

Figure 8:
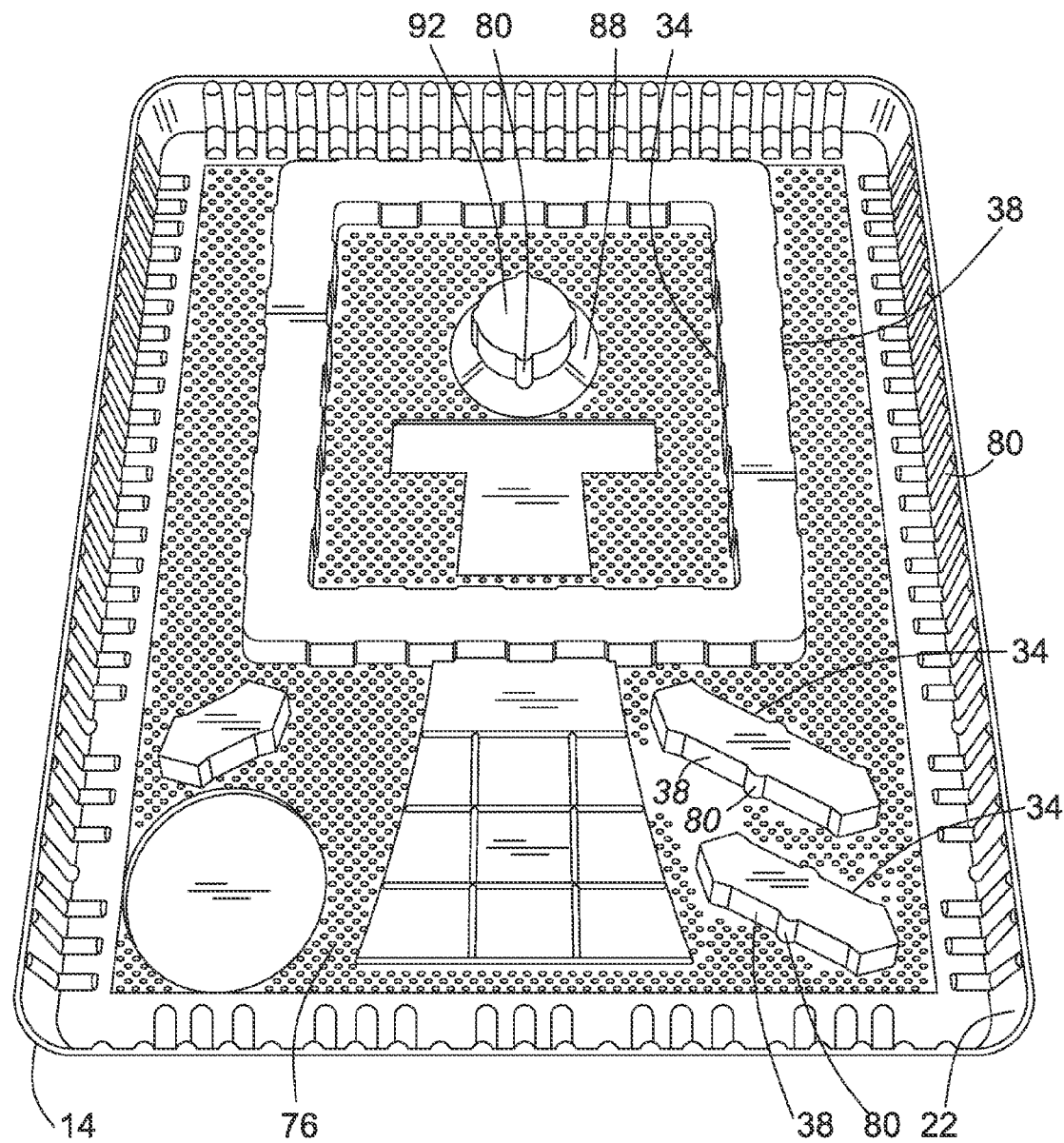
FIG. 8 is an underside perspective view of FIG. 7.
Figure 9:
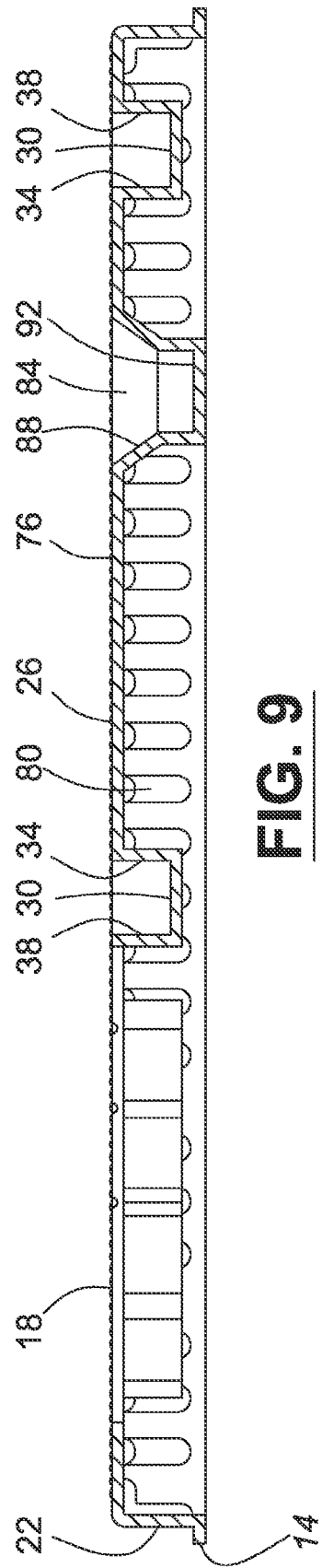
FIG. 9 is a cross-section along the line 9-9 in FIG. 7.
Figure 10:
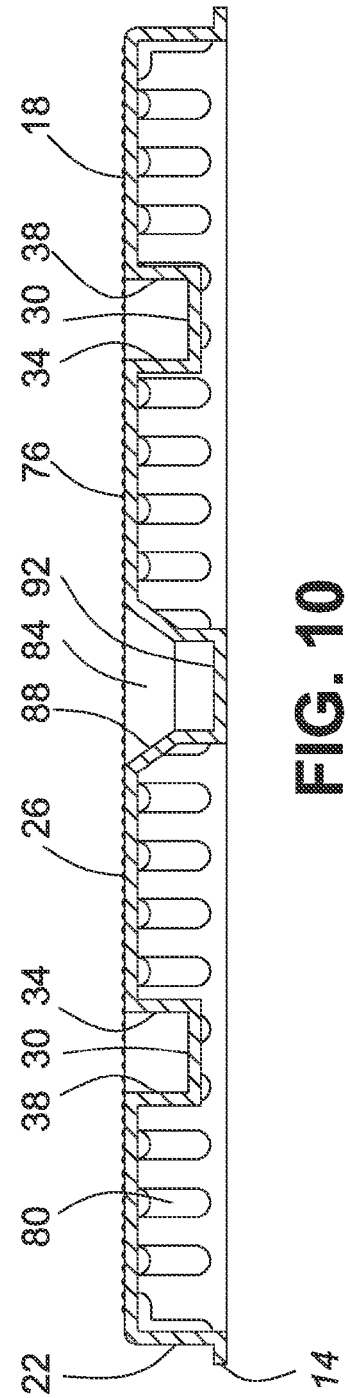
FIG. 10 is a cross-section along the line 10-10 in FIG. 7.

Another difference in the embodiment in FIG. 7, as compared to the one in FIG. 1, is that the FIG. 7 embodiment shows a structural improvement in a form of a plurality of recessed vertical grooves (80) defined within the support wall (22). These grooves (80) may vertically span the support wall (22) only, or may further extend horizontally across the top surface (18). These grooves (80) are recessed within the support wall (22), but they could equally be projections from the support wall (22) (meaning they could be projecting inwardly or outwardly from the support wall (22) as required). These grooves (80) further improve the platform's (72) rigidity, also making it less susceptible to buckling or collapse. The grooves (80) are spaced apart, and essentially identical in dimension to each other (excepting a distinction between grooves (80) that vertically span the support wall (22) only versus grooves (80) that further extend horizontally across the top surface (18)). The grooves (80) that extend horizontally across the top surface (18) form a border around the dimpled (76) area of the top surface (18). That is, the grooves (80) are found in a region that is not dimpled (76), and so the grooves (80) do not interfere with the function of the dimples (76). These grooves (80) could be implemented in the FIG. 1 embodiment if desired, since they are independent of the dimples (76). The grooves (80) can also be implemented into canal walls (34, 38) as seen in FIG. 8.

Yet another difference in the embodiment in FIG. 7, as compared to the one in FIG. 1, is that the FIG. 7 embodiment shows a structural improvement in a form of a bucket (84), disposed within the central area (26) of the platform (72). The bucket (84) has an open mouth portion that is flanged (88), or extending outwardly, continuing along the tray top surface (18), and preferably a closed bottom portion (92) which extends downwardly from the tray top surface (18). Preferably the bucket (84) extends downwardly such that the bucket (84) height is equal to the support wall (22) height. That is, both the bucket bottom (92) and the support wall (22) are in contact with a flat horizontal surface (usually a table or counter top (like that seen in FIGS. 2-5)). The bucket (84) improves the platform's (72) rigidity, making it less susceptible to buckling or collapse, as compared to the embodiment in FIG. 1, and does not interfere with gingerbread constructions made on the platform (72). Again, this allows a user (62) to place heavier constructions upon the platform (72), with more confidence the platform (72) will withstand the extra weight without buckling. The bucket (80) can be implemented independent of the grooves (80) and dimples (76).

In use, the user (62) first preferably prepares or obtains a standard adhesive (54) such as confectionery quick-setting icing, and stores said adhesive into a suitable dispenser (66). The adhesive (54) is dispensed along the required perimeters (58) of the vertically extending walls (42), and optionally along the canal 30 (see FIG. 2). The vertically extending walls (42) are then placed into the canal (30) at their required positions (see FIG. 3), and pressed against each other (if the project so requires) to bond the walls (42) to each other (see FIG. 4), and downwardly to bond the walls (42) to the canal (30) (by either a snug friction fit and/or by the adhesive). More walls (42) (if required) are similarly added, and the process is continued to completion of the project.

Specific embodiments of the present invention have been described to illustrate only, a manner in which this invention can be made and used. Implementation of variations and modifications will be apparent to one skilled in the art, and this invention is not limited by the embodiments illustrated. The present invention includes modifications, variations, and equivalents that fall within the spirit and scope of the underlying principles disclosed and claimed herein.

What is claimed is:

1. A gingerbread construction platform comprising:
   a) a tray having an elevated top surface, and defining support walls of pre-determined height to support and elevate the top surface from the tray;
   b) at least one canal defined within the top surface, to receive icing and an edible wall of pre-defined width therein, each canal being a pre-defined width and depth; and
   c) a plurality of dimples, the dimples being spread across the top surface in a pre-defined area.

2. The gingerbread construction platform in claim 1 wherein there are one selected from a group comprising at least two canals, and four canals.

3. The gingerbread construction platform in claim 2 wherein the canals communicate with each other to define one selected from a group comprising a continuous quadrilateral canal and a continuous square canal.

4. The gingerbread construction platform in claim 2 wherein the canals are spaced apart from each other.

5. The gingerbread construction platform in claim 1 wherein the at least one canal width is one selected from a group comprising less than, equal to, and greater than, the edible wall width.

6. The gingerbread construction platform in claim 1 wherein the dimples project one selected from a group comprising upwardly and downwardly.

7. The gingerbread construction platform in claim 1 wherein the support walls define at least one recessed vertical groove.

8. The gingerbread construction platform in claim 7 wherein the at least one recessed groove extends across the tray top surface.

9. The gingerbread construction platform in claim 7 wherein the at least one recessed groove forms a border around the pre-defined top surface dimple area.

10. The gingerbread construction platform in claim 1 wherein the at least one canal defines at least one recessed vertical groove.

11. The gingerbread construction platform in claim 1 wherein the top surface further defines a downwardly extending support bucket of pre-determined height.

12. The gingerbread construction platform in claim 11 wherein the bucket height equals the support wall height.

13. The gingerbread construction platform in claim 11 wherein the bucket defines one selected from a group comprising an open mouth, a flanged mouth, a closed bottom, and at least one recessed vertical groove.

14. A gingerbread construction platform comprising:
   a) a tray having an elevated top surface, and defining support walls of pre-determined height to support and elevate the top surface from the tray;
   b) at least one canal defined within the top surface, to receive icing and an edible wall of pre-defined width therein, each canal being a pre-defined width and depth; and
   c) the top surface defines a downwardly extending support bucket of pre-determined height.

15. The gingerbread construction platform in claim 14 wherein there are one selected from a group comprising at least two canals, and four canals.

16. The gingerbread construction platform in claim 15 wherein the canals are spaced apart from each other.

17. The gingerbread construction platform in claim 14 further comprising a plurality of dimples, the dimples being spread across the top surface in a pre-defined area.

18. The gingerbread construction platform in claim 17 wherein the dimples project one selected from a group comprising upwardly and downwardly.

19. The gingerbread construction platform in claim 14 wherein the four canals communicate with each other to define one selected from a group comprising a continuous quadrilateral canal and a continuous square canal.

20. The gingerbread construction platform in claim 14 wherein the at least one canal width is one selected from a group comprising less than, equal to, and greater than, the edible wall width.

21. The gingerbread construction platform in claim 14 wherein the support walls define at least one recessed vertical groove.

22. The gingerbread construction platform in claim 21 wherein the at least one recessed groove extends across the tray top surface.

23. The gingerbread construction platform in claim 21 wherein the at least one recessed groove forms a border around the pre-defined top surface dimple area.

24. The gingerbread construction platform in claim 14 wherein the at least one canal defines at least one recessed vertical groove.

25. The gingerbread construction platform in claim 14 wherein the bucket height equals the support wall height.

26. The gingerbread construction platform in claim 14 wherein the bucket defines one selected from a group comprising an open mouth, a flanged mouth, a closed bottom, and at least one recessed vertical groove.

* * * * *